US009191882B2

(12) United States Patent
Sampath et al.

(10) Patent No.: US 9,191,882 B2
(45) Date of Patent: Nov. 17, 2015

(54) SYSTEMS AND METHODS FOR IMPROVED ASSOCIATION IN WIRELESS NETWORKS

(71) Applicant: QUALCOMM Incorporated, San Diego, CA (US)

(72) Inventors: Hemanth Sampath, San Diego, CA (US); Simone Merlin, San Diego, CA (US); Vincent Knowles Jones, IV, Redwood City, CA (US); Gwendolyn Denise Barriac, Encinitas, CA (US); Bin Tian, San Diego, CA (US); Yan Zhou, San Diego, CA (US); Sameer Vermani, San Diego, CA (US); Rahul Tandra, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/065,233

(22) Filed: Oct. 28, 2013

(65) Prior Publication Data
US 2014/0128066 A1 May 8, 2014

Related U.S. Application Data

(60) Provisional application No. 61/722,018, filed on Nov. 2, 2012.

(51) Int. Cl.
H04W 4/00 (2009.01)
H04W 48/14 (2009.01)
H04W 48/20 (2009.01)

(52) U.S. Cl.
CPC .............. *H04W 48/14* (2013.01); *H04W 48/20* (2013.01)

(58) Field of Classification Search
CPC . H04W 74/0833; H04W 76/02; H04W 36/30; H04W 72/0406; H04W 48/14; H04W 48/20
USPC ................ 455/437, 439, 436, 435.1; 370/331
See application file for complete search history.

(56) References Cited

U.S. PATENT DOCUMENTS

| 5,371,738 | A  | * | 12/1994 | Moelard et al. ................ 370/331 |
| 5,428,816 | A  | * | 6/1995 | Barnett et al. ................. 455/437 |
| 6,542,742 | B2 |   | 4/2003 | Schramm et al. |
| 8,185,060 | B2 |   | 5/2012 | Agashe et al. |
| 8,630,645 | B2 | * | 1/2014 | Chowdhury et al. ......... 455/436 |
| 8,909,226 | B2 | * | 12/2014 | Zhang et al. .................. 455/436 |
| 2001/0044305 | A1 | * | 11/2001 | Reddy et al. ................... 455/436 |
| 2005/0064873 | A1 | * | 3/2005 | Karaoguz ............. H04L 63/104 455/452.2 |
| 2006/0111111 | A1 | * | 5/2006 | Ovadia .......................... 455/439 |
| 2006/0221919 | A1 |   | 10/2006 | McRae et al. |
| 2007/0010248 | A1 | * | 1/2007 | Dravida ................ H04W 60/00 455/435.1 |

(Continued)

Primary Examiner — Mong-Thuy Tran
(74) Attorney, Agent, or Firm — Knobbe, Martens, Olson & Bear LLP

(57) ABSTRACT

Systems, methods, and devices for communicating in a wireless network are provided. In some aspects, an access point may comprise a receiver configured to receive an access request message from a wireless station, the message comprising an indication of a plurality of network connection available to the wireless station including a link to a second access point. The receiver may be further configured to receive connectivity information associated with the link, based on the indication, from the second access point. The access point may further comprise a processor configured to determine whether to grant access to the wireless station based, at least in part, on the indication and the connectivity information, and a transmitter configured to transmit a response to the wireless station based on the determining.

11 Claims, 11 Drawing Sheets

(56) References Cited

U.S. PATENT DOCUMENTS

| | | | |
|---|---|---|---|
| 2010/0008230 A1* | 1/2010 | Khandekar | H04W 16/10 370/237 |
| 2013/0065633 A1 | 3/2013 | Sridhara et al. | |
| 2013/0090115 A1 | 4/2013 | Deivasigamani et al. | |
| 2013/0223235 A1* | 8/2013 | Hu | H04W 36/04 370/242 |

* cited by examiner

SYSTEMS AND METHODS FOR IMPROVED ASSOCIATION IN WIRELESS NETWORKS

CLAIM OF PRIORITY UNDER 35 U.S.C. §119

The present Application for patent claims priority to Provisional Application No. 61/722,018 entitled "SYSTEMS AND METHODS FOR IMPROVED ASSOCIATION IN WIRELESS NETWORKS" filed Nov. 2, 2012, and assigned to the assignee hereof. Provisional Application No. 61/722,018 is hereby expressly incorporated by reference herein.

BACKGROUND

1. Field

The present application relates generally to wireless communications, and more specifically to systems, methods, and devices that form an association between a station and an access point before performing wireless communications. Certain aspects herein relate to improving the association process.

2. Background

In many telecommunication systems, communications networks are used to exchange messages among several interacting spatially-separated devices. Networks may be classified according to geographic scope, which could be, for example, a metropolitan area, a local area, or a personal area. Such networks may be designated respectively as a wide area network (WAN), metropolitan area network (MAN), local area network (LAN), or personal area network (PAN). Networks also differ according to the switching/routing technique used to interconnect the various network nodes and devices (e.g., circuit switching vs. packet switching), the type of physical media employed for transmission (e.g., wired vs. wireless), and the set of communication protocols used (e.g., Internet protocol suite, SONET (Synchronous Optical Networking), Ethernet, etc.).

Wireless networks are often preferred when the network elements are mobile and thus have dynamic connectivity needs, or if the network architecture is formed in an ad hoc, rather than fixed, topology. Wireless networks employ intangible physical media in an unguided propagation mode using electromagnetic waves in the radio, microwave, infra-red, optical, etc. frequency bands. Wireless networks advantageously facilitate user mobility and rapid field deployment when compared to fixed wired networks.

SUMMARY

The systems, methods, and devices of the invention each have several aspects, no single one of which is solely responsible for its desirable attributes. Without limiting the scope of this invention as expressed by the claims which follow, some features will now be discussed briefly. After considering this discussion, and particularly after reading the section entitled "Detailed Description" one will understand how the features of this invention provide advantages that include providing wireless communication in sub-gigahertz bands for low power and long distance wireless communications.

One aspect of the disclosure provides an implementation of a method for communicating by an access point. The method includes receiving an access request message from a wireless station, the message including an indication of a plurality of network connections available to the wireless station including a link to a second access point. The method may further comprise receiving connectivity information associated with the link, based on the indication, from the second access point. The method may further comprise determining whether to grant access to the wireless station based, at least in part, on the indication and the connectivity information. The method may further include transmitting a response to the wireless station based on the determining.

Another aspect discloses is an access point for wireless communication. The access point includes a receiver configured to receive an access request message from a wireless station, the message comprising an indication of a plurality of network connections available to the wireless station including a link to a second access point. The receiver may be further configured to receive connectivity information associated with the link, based on the indication, from the second access point. The access point may further include a processor configured to determine whether to grant access to the wireless station based, at least in part, on the indication and the connectivity information. The access point may further include a transmitter configured to transmit a response to the wireless station based on the determining.

Another aspect discloses is an access point for wireless communication. The access point includes means for receiving an access request message from a wireless station, the message comprising an indication of a plurality of network connections available to the wireless station including a link to a second access point. The access point may further include means for receiving connectivity information associated with the link, based on the indication, from the second access point. The apparatus may further include means for determining whether to grant access to the wireless station based, at least in part, on the indication and the connectivity information. The access point may further include means for transmitting a response to the wireless station based on the determining.

DETAILED DESCRIPTION

Figure 1A:
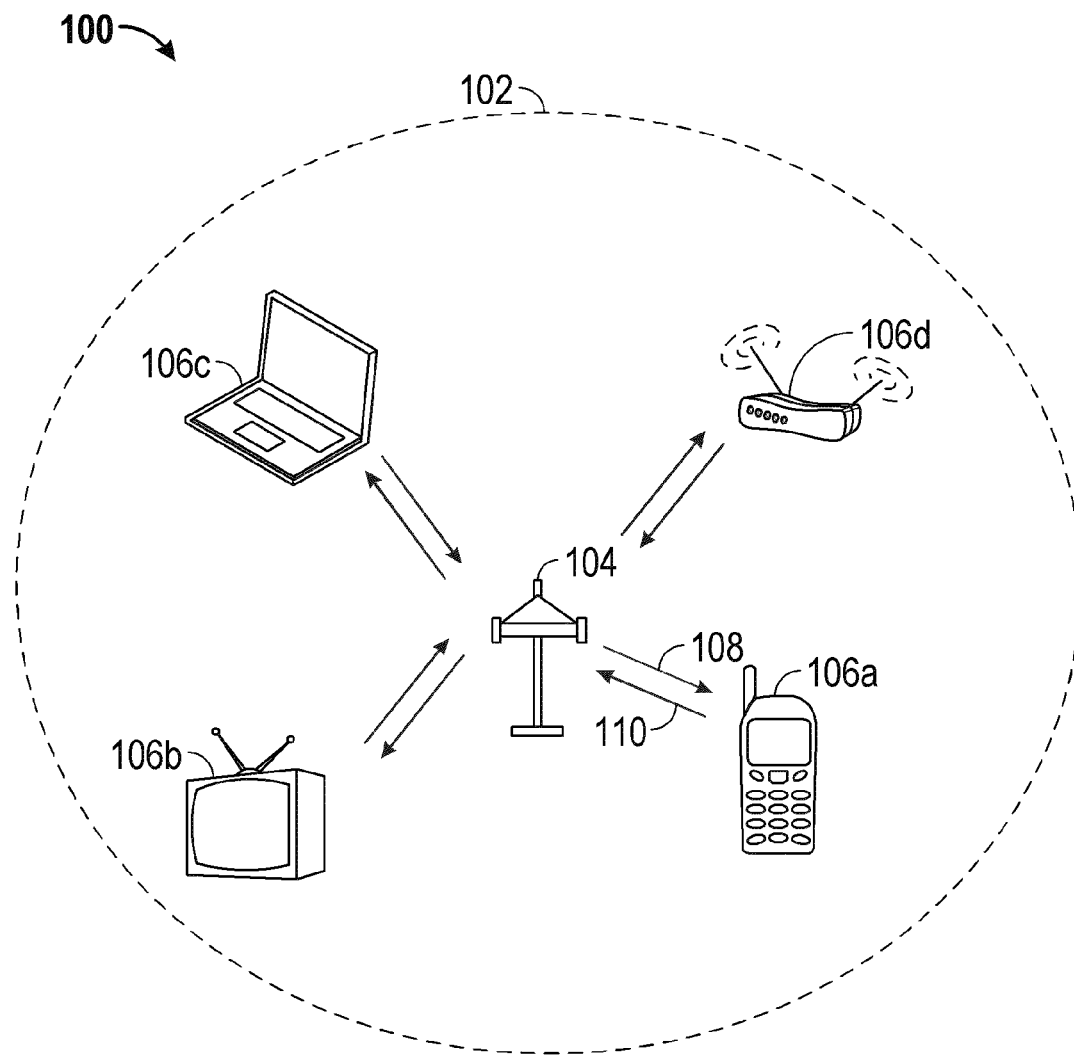
FIG. 1A illustrates an example of a wireless communication system in which aspects of the present disclosure may be employed.

Various aspects of the novel systems, apparatuses, and methods are described more fully hereinafter with reference to the accompanying drawings. The teachings disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of or combined with any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Wireless network technologies may include various types of wireless local area networks (WLANs). A WLAN may be used to interconnect nearby devices together, employing widely used networking protocols. The various aspects described herein may apply to any communication standard, such as WiFi or, more generally, any member of the IEEE 802.11 family of wireless protocols. For example, the various aspects described herein may be used as part of the IEEE 802.11ah protocol, which uses sub-1 GHz bands.

In some aspects, wireless signals in a sub-gigahertz band may be transmitted according to the 802.11ah protocol using orthogonal frequency-division multiplexing (OFDM), direct-sequence spread spectrum (DSSS) communications, a combination of OFDM and DSSS communications, or other schemes. Implementations of the 802.11 ah protocol may be used for sensors, metering, and smart grid networks. Advantageously, aspects of certain devices implementing the 802.11ah protocol may consume less power than devices implementing other wireless protocols, and/or may be used to transmit wireless signals across a relatively long range, for example about one kilometer or longer.

Certain of the devices described herein may further implement Multiple Input Multiple Output (MIMO) technology and be implemented as part of the 802.11ah standard. A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels or streams, where $N_S \leq \min\{N_T, N_R\}$. Each of the $N_S$ independent channels corresponds to a dimension. The MIMO system can provide improved performance (e.g., higher throughput and/or greater reliability) if the additional dimensionalities created by the multiple transmit and receive antennas are utilized.

In some implementations, a WLAN includes various devices which are the components that access the wireless network. For example, there may be two types of devices: access points ("APs") and clients (also referred to as stations, or "STAs"). In general, an AP serves as a hub or base station for the WLAN and an STA serves as a user of the WLAN. For example, a STA may be a laptop computer, a personal digital assistant (PDA), a mobile phone, etc. In an example, an STA connects to an AP via a WiFi (e.g., IEEE 802.11 protocol such as 802.11ah) compliant wireless link to obtain general connectivity to the Internet or to other wide area networks. In some implementations an STA may also be used as an AP.

An access point ("AP") may also comprise, be implemented as, or known as a NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, or some other terminology.

A station "STA" may also comprise, be implemented as, or known as an access terminal ("AT"), a subscriber station, a subscriber unit, a mobile station, a remote station, a remote terminal, a user terminal, a user agent, a user device, user equipment, or some other terminology. In some implementations an access terminal may comprise a cellular telephone, a cordless telephone, a Session Initiation Protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein may be incorporated into a phone (e.g., a cellular phone or smartphone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured to communicate via a wireless medium.

As discussed above, certain of the devices described herein may implement the 802.11 ah standard, for example. Such devices, whether used as an STA or AP or other device, may be used for smart metering or in a smart grid network. Such devices may provide sensor applications or be used in home automation. The devices may instead or in addition be used in a healthcare context, for example for personal healthcare. They may also be used for surveillance, to enable extended-range Internet connectivity (e.g., for use with hotspots), or to implement machine-to-machine communications.

As also discussed above, some of the wireless devices described herein may form an association between a station and an access point. The association may facilitate wireless communications between the station and the access point. In some implementations, a station may have access to a plurality of access points with which to associate. In some implementations, the station may select an access point to form an association based on one or more characteristics of wireless communication between the station and the access point. For example, a station may choose to form an association with an access point that exhibits the strongest signal strength from the station's perspective. Alternatively, the station may select an access point for association based on a utilization of the access point.

In some implementations, a first access point may receive an association request from a station, but refuse to accept the association with the station. Instead, in some implementations the first access point may provide the station with information indicating a second access point. The second access point may accept an association with the station that provides improved wireless communications for the station.

In some implementations, the first access point may communicate with the second access point, for example, over a back-haul network or over a wireless medium. The access points may exchange connectivity information relating to the station requesting the association. From that exchange, the access points may determine the station should associate with the second access point. For example, the access points may determine that the second access point has more throughput available for the station's communication than the first access point.

Some disclosed embodiments provide methods or apparatus that adapt a transmission parameter based on communication between access points. For example, a first access point may transmit a message indicating a transmission parameter, such as a transmission power level or a transmission rate. One or more other access points may receive this message. A second access point receiving the transmission parameter may determine that wireless communications would be improved if the first access point were to change its transmission parameter. In an embodiment, the second access point may transmit a message to the first access point indicating the first access point should make such a change. In response, the first access point may change the transmission parameter, and transmit a second message based on the changed transmission parameter. In an embodiment, the second message may be a beacon message.

FIG. 1A illustrates an example of a wireless communication system 100 in which aspects of the present disclosure may be employed. The wireless communication system 100 may operate pursuant to a wireless standard, for example the 802.11ah standard. The wireless communication system 100 may include an AP 104, which communicates with STAs 106a, 106b, 106c, and 106d (collectively STAs 106).

A variety of processes and methods may be used for transmissions in the wireless communication system 100 between the AP 104 and the STAs 106. For example, signals may be sent and received between the AP 104 and the STAs 106 in accordance with OFDM/OFDMA techniques. If this is the case, the wireless communication system 100 may be referred to as an OFDM/OFDMA system. Alternatively, signals may be sent and received between the AP 104 and the STAs 106 in accordance with CDMA techniques. If this is the case, the wireless communication system 100 may be referred to as a CDMA system.

A communication link that facilitates transmission from the AP 104 to one or more of the STAs 106 may be referred to as a downlink (DL) 108, and a communication link that facilitates transmission from one or more of the STAs 106 to the AP 104 may be referred to as an uplink (UL) 110. Alternatively, a downlink 108 may be referred to as a forward link or a forward channel, and an uplink 110 may be referred to as a reverse link or a reverse channel.

The AP 104 may act as a base station and provide wireless communication coverage in a basic service area (BSA) 102. The AP 104 along with the STAs 106 associated with the AP 104 and that use the AP 104 for communication may be referred to as a basic service set (BSS). It should be noted that the wireless communication system 100 may not have a central AP 104, but rather may function as a peer-to-peer network between the STAs 106. Accordingly, the functions of the AP 104 described herein may alternatively be performed by one or more of the STAs 106.

Figure 1B:
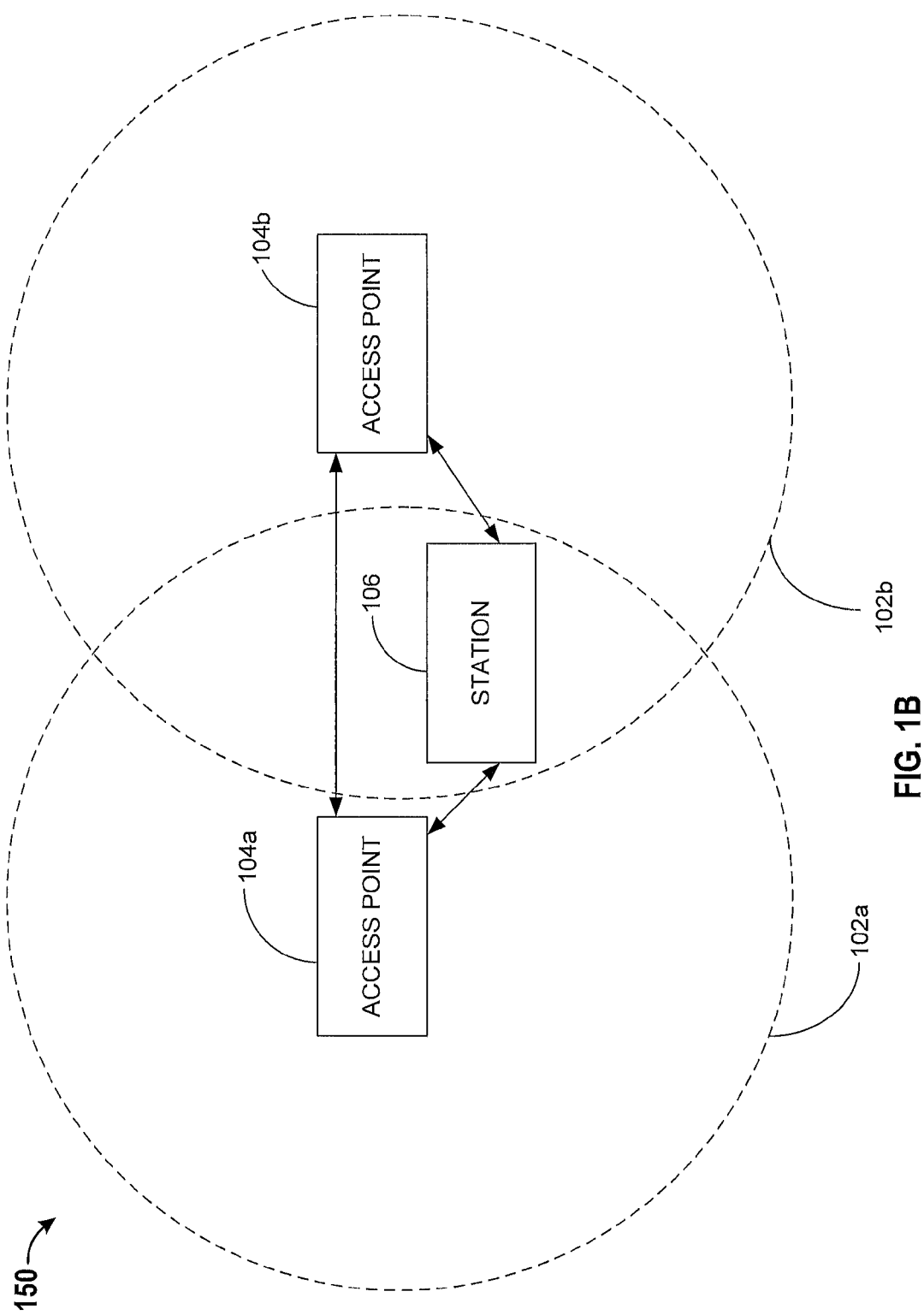
FIG. 1B illustrates an example of a wireless communication system in which aspects of the present disclosure may be employed.

FIG. 1B illustrates an example of a wireless communication system 150 in which aspects of the present disclosure may be employed. The wireless communication system 150 may operate pursuant to a wireless standard, for example the 802.11ah standard. The wireless communication system 150 may include a first AP 104a, including a basic service area (BSA) 102a, and a second AP 104b, having a basic service area (BSA) 102b. In some embodiments, access points 104a and 104b may communicate as shown. In one embodiment, the communication may be over the wireless medium. In another embodiment, access points 104a and 104b may communicate over a back-haul network (not shown). The wireless communication system 150 also includes a station 106, which is within both the BSA 102a of access point 104a and the BSA 102b of access point 104b.

Figure 2:
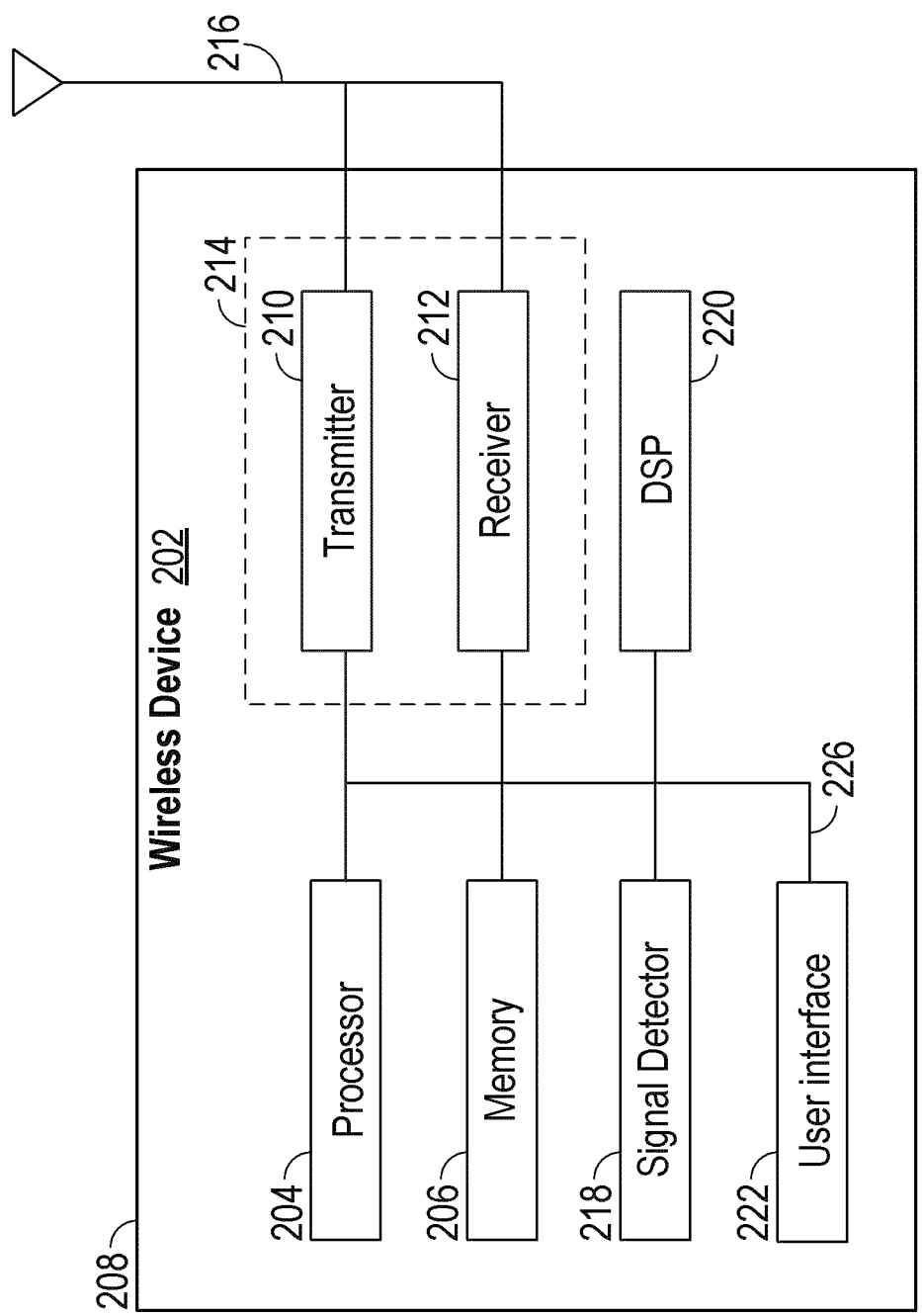
FIG. 2 shows a functional block diagram of an exemplary wireless device that may be employed within the wireless communication system of FIG. 1A or FIG. 1B.

FIG. 2 illustrates various components that may be utilized in a wireless device 202 that may be employed within the wireless communication system 100 or the wireless communication system 150. The wireless device 202 is an example of a device that may be configured to implement the various methods described herein. For example, the wireless device 202 may comprise the AP 104 or one of the STAs 106 of FIG. 1A. Alternatively, the wireless device 202 may comprise either the AP 104a or the AP 104b, or the STA 106 of FIG. 1B.

The wireless device 202 may include a processor 204 which controls operation of the wireless device 202. The processor 204 may also be referred to as a central processing unit (CPU). Memory 206, which may include both read-only memory (ROM) and random access memory (RAM), provides instructions and data to the processor 204. A portion of the memory 206 may also include non-volatile random access memory (NVRAM). The processor 204 typically performs logical and arithmetic operations based on program instructions stored within the memory 206. The instructions in the memory 206 may be executable to implement the methods described herein.

When the wireless device 202 is implemented or used as a transmitting node, the processor 204 may be configured to select one of a plurality of media access control (MAC) header types, and to generate a packet having that MAC header type. For example, the processor 204 may be configured to generate a packet comprising a MAC header and a payload and to determine what type of MAC header to use, as discussed in further detail below.

When the wireless device 202 is implemented or used as a receiving node, the processor 204 may be configured to process packets of a plurality of different MAC header types. For example, the processor 204 may be configured to determine the type of MAC header used in a packet and process the packet and/or fields of the MAC header accordingly as further discussed below.

The processor 204 may comprise or be a component of a processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The wireless device 202 may also include a housing 208 that may include a transmitter 210 and a receiver 212 to allow transmission and reception of data between the wireless device 202 and a remote location. The transmitter 210 and receiver 212 may be combined into a transceiver 214. An antenna 216 may be attached to the housing 208 and electrically coupled to the transceiver 214. The wireless device 202 may also include (not shown) multiple transmitters, multiple receivers, multiple transceivers, and/or multiple antennas.

The transmitter 210 may be configured to wirelessly transmit packets having different MAC header types. For example, the transmitter 210 may be configured to transmit packets with different types of headers generated by the processor 204, discussed above.

The receiver 212 may be configured to wirelessly receive packets having different MAC header types. In some aspects, the receiver 212 is configured to detect a type of a MAC header used and process the packet accordingly, as discussed in further detail below.

The wireless device 202 may also include a signal detector 218 that may be used in an effort to detect and quantify the level of signals received by the transceiver 214. The signal detector 218 may detect such signals as total energy, energy per subcarrier per symbol, power spectral density and other signals. The wireless device 202 may also include a digital signal processor (DSP) 220 for use in processing signals. The DSP 220 may be configured to generate a data unit for transmission. In some aspects, the data unit may comprise a physical layer data unit (PPDU). In some aspects, the PPDU is referred to as a packet.

The wireless device 202 may further comprise a user interface 222 in some aspects. The user interface 222 may comprise a keypad, a microphone, a speaker, and/or a display. The user interface 222 may include any element or component that conveys information to a user of the wireless device 202 and/or receives input from the user.

The various components of the wireless device 202 may be coupled together by a bus system 226. The bus system 226 may include a data bus, for example, as well as a power bus, a control signal bus, and a status signal bus in addition to the data bus. Those of skill in the art will appreciate the components of the wireless device 202 may be coupled together or accept or provide inputs to each other using some other mechanism.

Although a number of separate components are illustrated in FIG. 2, one or more of the components may be combined or commonly implemented. For example, the processor 204 may be used to implement not only the functionality described above with respect to the processor 204, but also to implement the functionality described above with respect to the signal detector 218 and/or the DSP 220. Further, each of the components illustrated in FIG. 2 may be implemented using a plurality of separate elements. Furthermore, the processor 204 may be used to implement any of the components, modules, circuits, or the like described below, or each may be implemented using a plurality of separate elements.

For ease of reference, when the wireless device 202 is configured as a transmitting node, it is hereinafter referred to as a wireless device 202t. Similarly, when the wireless device 202 is configured as a receiving node, it is hereinafter referred to as a wireless device 202r. A device in the wireless communication system 100 may implement only functionality of a transmitting node, only functionality of a receiving node, or functionality of both a transmitting node and a receive node.

As discussed above, the wireless device 202 may comprise an AP 104 or a STA 106, and may be used to transmit and/or receive communications having a plurality of MAC header types.

Figure 3:
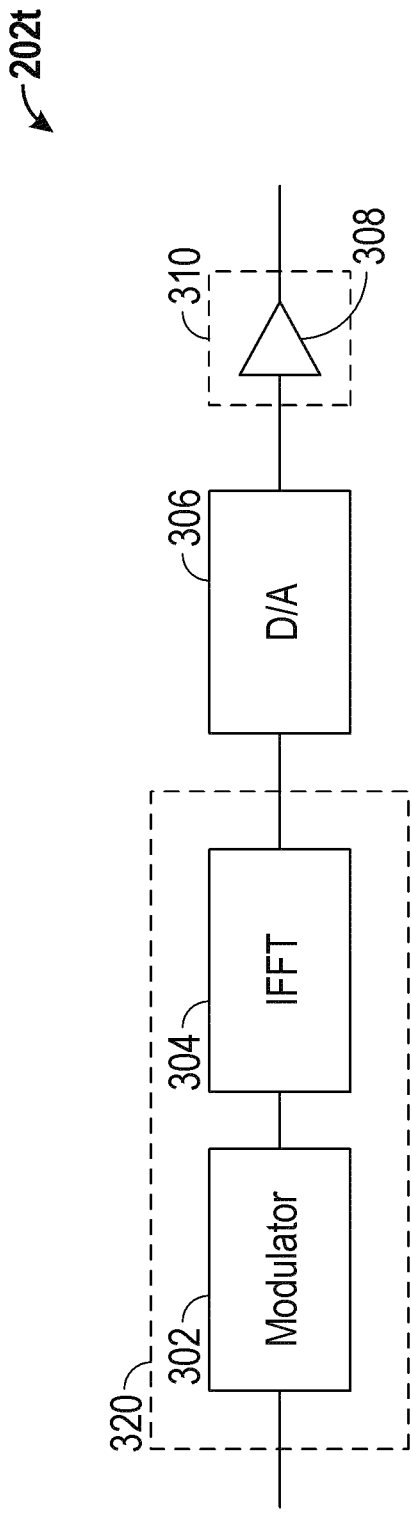
FIG. 3 shows a functional block diagram of exemplary components that may be utilized in the wireless device of FIG. 2 to transmit wireless communications.

As discussed above, the wireless device 202 may comprise an AP 104 or an STA 106, and may be used to transmit and/or receive communications. FIG. 3 illustrates various components that may be utilized in the wireless device 202t to transmit wireless communications. The components illustrated in FIG. 3 may be used, for example, to transmit OFDM communications. In some aspects, the components illustrated in FIG. 3 are used to generate and transmit packets to be sent over a bandwidth of less than or equal to 1 MHz.

The wireless device 202t of FIG. 3 may comprise a modulator 302 configured to modulate bits for transmission. For example, the modulator 302 may determine a plurality of symbols from bits received from the processor 204 (FIG. 2) or the user interface 222 (FIG. 2), for example by mapping bits to a plurality of symbols according to a constellation. The bits may correspond to user data or to control information. In some aspects, the bits are received in codewords. In one aspect, the modulator 302 comprises a QAM (quadrature amplitude modulation) modulator, for example a 16-QAM modulator or a 64-QAM modulator. In other aspects, the modulator 302 comprises a binary phase-shift keying (BPSK) modulator or a quadrature phase-shift keying (QPSK) modulator.

The wireless device 202t may further comprise a transform module 304 configured to convert symbols or otherwise modulated bits from the modulator 302 into a time domain. In FIG. 3, the transform module 304 is illustrated as being implemented by an inverse fast Fourier transform (IFFT) module. In some implementations, there may be multiple transform modules (not shown) that transform units of data of different sizes. In some implementations, the transform module 304 may be itself configured to transform units of data of different sizes. For example, the transform module 304 may be configured with a plurality of modes, and may use a different number of points to convert the symbols in each mode. For example, the IFFT may have a mode where 32 points are used to convert symbols being transmitted over 32 tones (i.e., subcarriers) into a time domain, and a mode where 64 points are used to convert symbols being transmitted over 64 tones into a time domain. The number of points used by the transform module 304 may be referred to as the size of the transform module 304.

In FIG. 3, the modulator 302 and the transform module 304 are illustrated as being implemented in the DSP 320. In some aspects, however, one or both of the modulator 302 and the transform module 304 are implemented in the processor 204 or in another element of the wireless device 202t (e.g., see description above with reference to FIG. 2).

As discussed above, the DSP 320 may be configured to generate a data unit for transmission. In some aspects, the modulator 302 and the transform module 304 may be configured to generate a data unit comprising a plurality of fields including control information and a plurality of data symbols.

Returning to the description of FIG. 3, the wireless device 202b may further comprise a digital to analog converter 306 configured to convert the output of the transform module into an analog signal. For example, the time-domain output of the transform module 306 may be converted to a baseband OFDM signal by the digital to analog converter 306. The digital to analog converter 306 may be implemented in the processor 204 or in another element of the wireless device 202 of FIG. 2. In some aspects, the digital to analog converter 306 is implemented in the transceiver 214 (FIG. 2) or in a data transmit processor.

The analog signal may be wirelessly transmitted by the transmitter 310. The analog signal may be further processed before being transmitted by the transmitter 310, for example by being filtered or by being upconverted to an intermediate or carrier frequency. In the aspect illustrated in FIG. 3, the transmitter 310 includes a transmit amplifier 308. Prior to being transmitted, the analog signal may be amplified by the transmit amplifier 308. In some aspects, the amplifier 308 comprises a low noise amplifier (LNA).

The transmitter 310 is configured to transmit one or more packets or data units in a wireless signal based on the analog signal. The data units may be generated using the processor 204 (FIG. 2) and/or the DSP 320, for example using the modulator 302 and the transform module 304 as discussed above. Data units that may be generated and transmitted as discussed above are described in additional detail below.

Figure 4:
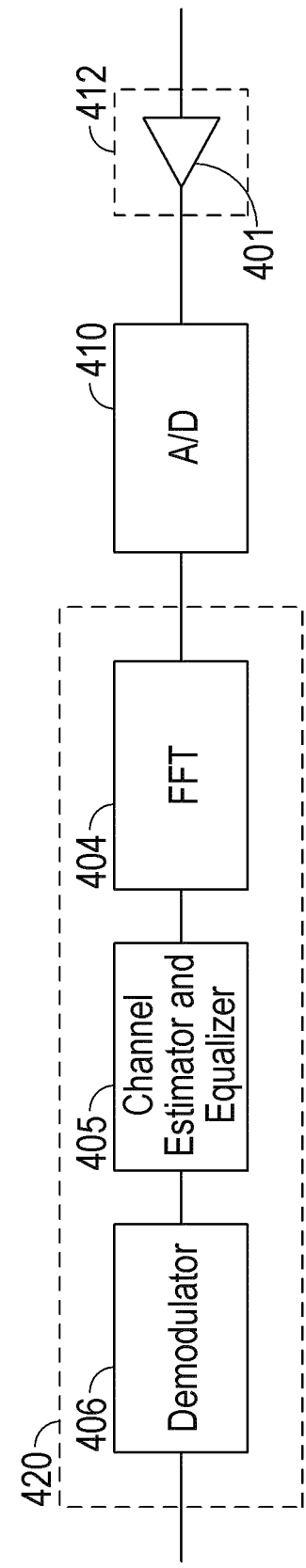
FIG. 4 shows a functional block diagram of exemplary components that may be utilized in the wireless device of FIG. 2 to receive wireless communications.

FIG. 4 illustrates various components that may be utilized in the wireless device 202 of FIG. 2 to receive wireless communications. The components illustrated in FIG. 4 may be used, for example, to receive OFDM communications. In some aspects, the components illustrated in FIG. 4 are used to receive data units over a bandwidth of equal to or less than 1 MHz. For example, the components illustrated in FIG. 4 may be used to receive data units transmitted by the components discussed above with respect to FIG. 3.

The receiver 412 of wireless device 202b is configured to receive one or more packets or data units in a wireless signal. Data units that may be received and decoded or otherwise processed as discussed below.

In the aspect illustrated in FIG. 4, the receiver 412 includes a receive amplifier 401. The receive amplifier 401 may be configured to amplify the wireless signal received by the receiver 412. In some aspects, the receiver 412 is configured to adjust the gain of the receive amplifier 401 using an automatic gain control (AGC) procedure. In some aspects, the automatic gain control uses information in one or more received training fields, such as a received short training field (STF) for example, to adjust the gain. Those having ordinary skill in the art will understand methods for performing AGC. In some aspects, the amplifier 401 comprises an LNA.

The wireless device 202r may comprise an analog to digital converter 410 configured to convert the amplified wireless signal from the receiver 412 into a digital representation thereof. Further to being amplified, the wireless signal may be processed before being converted by the digital to analog converter 410, for example by being filtered or by being downconverted to an intermediate or baseband frequency. The analog to digital converter 410 may be implemented in the processor 204 (FIG. 2) or in another element of the wireless device 202r. In some aspects, the analog to digital converter 410 is implemented in the transceiver 214 (FIG. 2) or in a data receive processor.

The wireless device 202r may further comprise a transform module 404 configured to convert the representation of the wireless signal into a frequency spectrum. In FIG. 4, the transform module 404 is illustrated as being implemented by a fast Fourier transform (FFT) module. In some aspects, the transform module may identify a symbol for each point that it uses. As described above with reference to FIG. 3, the transform module 404 may be configured with a plurality of modes, and may use a different number of points to convert the signal in each mode. For example, the transform module 404 may have a mode where 32 points are used to convert a signal received over 32 tones into a frequency spectrum, and a mode where 64 points are used to convert a signal received over 64 tones into a frequency spectrum. The number of points used by the transform module 404 may be referred to as the size of the transform module 404. In some aspects, the transform module 404 may identify a symbol for each point that it uses.

The wireless device 202b may further comprise a channel estimator and equalizer 405 configured to form an estimate of the channel over which the data unit is received, and to remove certain effects of the channel based on the channel estimate. For example, the channel estimator 405 may be configured to approximate a function of the channel, and the channel equalizer may be configured to apply an inverse of that function to the data in the frequency spectrum.

The wireless device 202t may further comprise a demodulator 406 configured to demodulate the equalized data. For example, the demodulator 406 may determine a plurality of bits from symbols output by the transform module 404 and the channel estimator and equalizer 405, for example by reversing a mapping of bits to a symbol in a constellation. The bits may be processed or evaluated by the processor 204 (FIG. 2), or used to display or otherwise output information to the user interface 222 (FIG. 2). In this way, data and/or information may be decoded. In some aspects, the bits correspond to codewords. In one aspect, the demodulator 406 comprises a QAM (quadrature amplitude modulation) demodulator, for example a 16-QAM demodulator or a 64-QAM demodulator. In other aspects, the demodulator 406 comprises a binary phase-shift keying (BPSK) demodulator or a quadrature phase-shift keying (QPSK) demodulator.

In FIG. 4, the transform module 404, the channel estimator and equalizer 405, and the demodulator 406 are illustrated as being implemented in the DSP 420. In some aspects, however, one or more of the transform module 404, the channel estimator and equalizer 405, and the demodulator 406 are implemented in the processor 204 (FIG. 2) or in another element of the wireless device 202 (FIG. 2).

As discussed above, the wireless signal received at the receiver 212 comprises one or more data units. Using the functions or components described above, the data units or data symbols therein may be decoded evaluated or otherwise evaluated or processed. For example, the processor 204 (FIG. 2) and/or the DSP 420 may be used to decode data symbols in the data units using the transform module 404, the channel estimator and equalizer 405, and the demodulator 406.

Data units exchanged by the AP 104 and the STA 106 may include control information or data, as discussed above. At the physical (PHY) layer, these data units may be referred to as physical layer protocol data units (PPDUs). In some aspects, a PPDU may be referred to as a packet or physical layer packet. Each PPDU may comprise a preamble and a payload. The preamble may include training fields and a SIG field. The payload may comprise a Media Access Control (MAC) header or data for other layers, and/or user data, for example. The payload may be transmitted using one or more data symbols. The systems, methods, and devices herein may utilize data units with training fields whose peak-to-power ratio has been minimized.

The wireless device 202a shown in FIG. 3 shows an example of a single transmit chain to be transmitted over an antenna. The wireless device 202b shown in FIG. 4 shows an example of a single receive chain to be received over an antenna. In some implementations, the wireless device 202a or 202b may implement a portion of a MIMO system using multiple antennas to simultaneously transmit data.

Certain implementations described herein may be directed to wireless communication systems that may be used for smart metering or be used in a smart grid network. These wireless communication systems may be used to provide sensor applications or be used in home automation. Wireless devices used in such systems may instead or in addition be used in a healthcare context, for example, for personal healthcare. They may also be used for surveillance, to enable extended-range Internet connectivity (e.g., for use with hotspots), or to implement machine-to-machine communications. Accordingly, some implementations may use low data rates such as approximately 150 Kbps. Implementations may further have increased link budget gains (e.g., around 20 dB) over other wireless communications such as 802.11b. In accordance with low data rates, if wireless nodes are configured for use in a home environment, certain aspects may be directed to implementations with good in-home coverage without power amplification. Furthermore, certain aspects may be directed to single-hop networking without using a MESH protocol. In addition, certain implementations may result in significant outdoor coverage improvement with power amplification over other wireless protocols. Furthermore, certain aspects may be directed to implementations that may accommodate large outdoor delay-spread and reduced sensitivity to Doppler. Certain implementations may achieve similar LO accuracy as traditional WiFi.

Accordingly, certain implementations are directed to sending wireless signals with low bandwidths in sub-gigahertz bands. For example, in one exemplary implementation, a symbol may be configured to be transmitted or received using a bandwidth of 1 MHz. The wireless device 202 of FIG. 2 may be configured to operate in one of several modes. In one mode, symbols such as OFDM symbols may be transmitted or received using a bandwidth of 1 MHz. In another mode, symbols may be transmitted or received using a bandwidth of 2 MHz. Additional modes may also be provided for transmitting or receiving symbols using a bandwidth of 4 MHz, 8 MHz, 16 MHz, and the like. The bandwidth may also be referred to as the channel width.

Each mode may use a different number of tones/subcarriers for transmitting the information. For example, in one implementation, a 1 MHz mode (corresponding to transmitting or receiving symbols using a bandwidth of 1 MHz) may use 32 tones. In one aspect, using a 1 MHz mode may provide for a 13 dB noise reduction as compared to a bandwidth such as 20 MHz. In addition, low rate techniques may be used to overcome effects such as frequency diversity losses due to a lower bandwidth which could result in 4-5 dB losses depending on channel conditions. To generate/evaluate symbols sent or received using 32 tones, a transform module 304 or 404 as described above with reference to FIGS. 3 and 4 above may be configured to use a 32 point mode (e.g., a 32 point IFFT or FFT). The 32 tones may be allocated as data tones, pilot tones, guard tones, and a DC tone. In one implementation, 24 tones may be allocated as data tones, 2 tones may be allocated as pilot tones, five tones may be allocated as guard tones, and 1 tone may be reserved for the DC tone. In this implementation, the symbol duration may be configured to be 40 μs including cyclic prefix. Other tone allocations are also possible.

For example, a wireless device 202a (FIG. 3) may be configured to generate a packet for transmission via a wireless signal using a bandwidth of 1 MHz. In one aspect, the bandwidth may be approximately 1 MHz where approximately 1 MHz may be within a range of 0.8 MHz to 1.2 MHz. The packet may be formed of one or more OFDM symbols having 32 tones allocated as described using a DSP 320 (FIG. 3) or other processor as described above. A transform module 304 (FIG. 3) in a transmit chain may be configured as an IFFT module operating according to a thirty-two point mode to convert the packet into a time domain signal. A transmitter 310 (FIG. 3) may then be configured to transmit the packet.

Likewise, a wireless device 202b (FIG. 4) may be configured to receive the packet over a bandwidth of 1 MHz. In one aspect, the bandwidth may be approximately 1 MHz where approximately 1 MHz may be within a range of 0.8 MHz to 1.2 MHz. The wireless device 202b may include a DSP 420 including a transform module 404 (FIG. 4) in a receive chain that may be configured as an FFT module operating according to a thirty-two point mode to transform the time domain signal into a frequency spectrum. A DSP 420 may be configured to evaluate the packet. The 1 MHz mode may support a modulation and coding scheme (MCS) for both a low data rate and a "normal" rate. According to some implementations, the preamble 702 may be designed for a low rate mode that offers reliable detection and improved channel estimation as will be further described below. Each mode may be configured to use a corresponding preamble configured to optimize transmissions for the mode and desired characteristics.

In addition to a 1 MHz mode, a 2 MHz mode may additionally be available that may be used to transmit and receive symbols using 64 tones. In one implementation, the 64 tones may be allocated as 52 data tones, 4 pilot tones, 1 DC tone, and 7 guard tones. As such, a transform module 304 or 404 of FIGS. 3 and 4 may be configured to operate according to a 64 point mode when transmitting or receiving 2 MHz symbols. The symbol duration may also be 40 μs including cyclic prefix. Additional modes with different bandwidths (e.g., 4 MHz, 8 MHz, and 16 MHz) may be provided that may use transform modules 304 or 404 operating in modes of corresponding different sizes (e.g., 128 point FFT, 256 point FFT, 512 point FFT, etc.). In addition, each of the modes described above may be configured additionally according to both a single user mode and a multi user mode. Wireless signals using bandwidths less than or equal to 2 MHz may provide various advantages for providing wireless nodes that are configured to meet global regulatory constraints over a broad range of bandwidth, power, and channel limitations.

Figure 5:
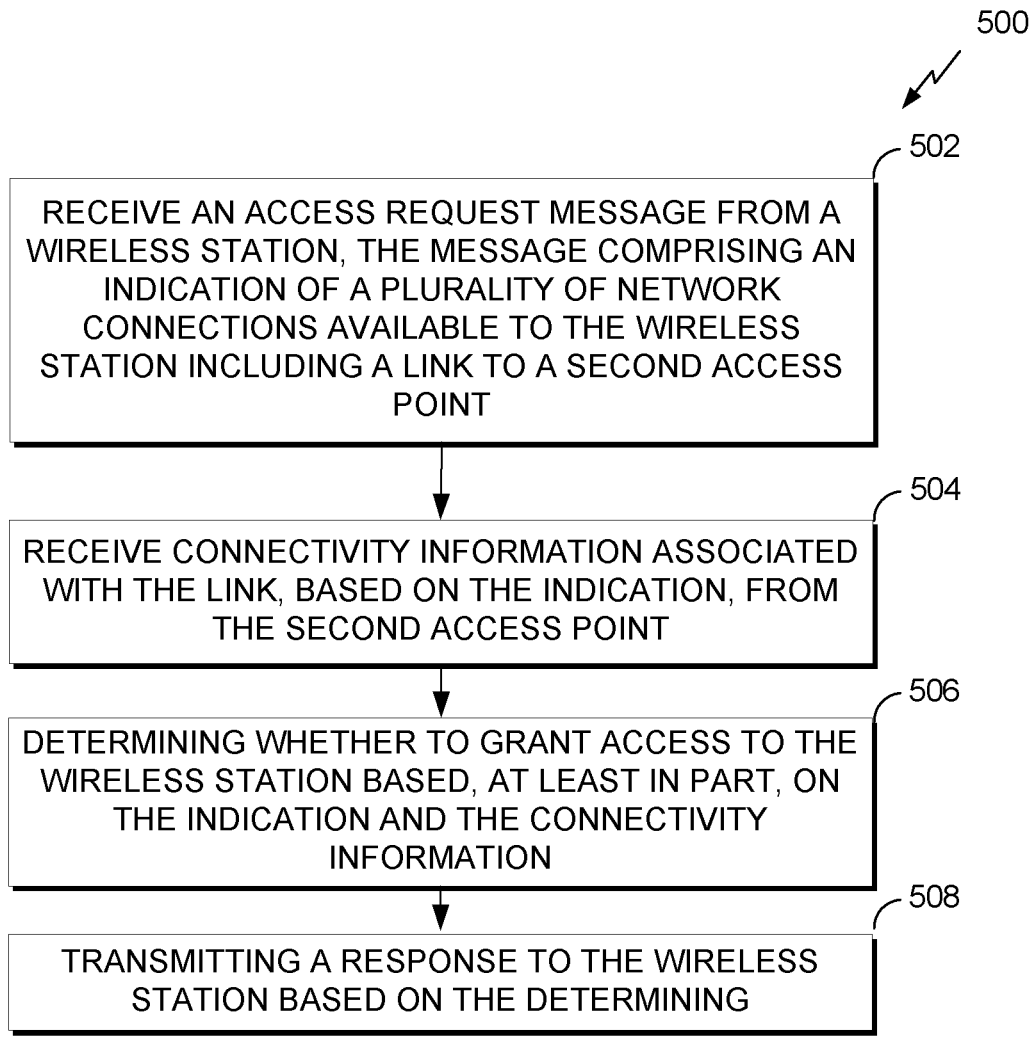
FIG. 5 is a flowchart of an exemplary method 500 for communicating on a wireless network.

FIG. 5 is a flowchart of an exemplary method 500 for communicating on a wireless network. In an embodiment, process 500 may be performed by wireless device 202, illustrated in FIG. 2. In an embodiment, process 500 may be performed by an access point. Some embodiments of process 500 may provide improved allocation of wireless network resources by improving the quality of associations between wireless stations and access points. While wireless stations have previously been responsible for selecting an access point to associate with, wireless stations may not always make the best choice for which access point to associate either to provide the best connectivity for their own data or to provide improved overall wireless network resource allocation as a whole. To improve the associations between wireless stations and access points, access points may communicate with each other and exchange information regarding wireless network conditions between the access points and one or more wireless stations.

Wireless stations may also provide information to access points when associating. For example, wireless stations may generate a list of network connections that are available to provide network services to the wireless station. The wireless stations may then include an indication of the list to an access point when attempting to associate with the access point. Upon receiving the list, the access point may communicate with other access points corresponding to the network connections in the list. This communication may allow the access point to determine whether it is the best access point to associate with the requesting wireless station, or if one of the other access points indicated by the list may be better from either a wireless station, access point, or overall wireless network perspective. This may result in improved wireless services for the wireless station and/or improved utilization of wirelesss network resources.

Block 502 includes receiving an access request message from a wireless station. The message includes an indication of a plurality of network connection available to the station including a link to a second access point. In an embodiment, the message may further indicate one or more parameters or characteristics of the network connection. For example, the message may indicate a signal strength associated with one or more of the plurality of network connections available to the wireless station. In an embodiment, the message may indicate a utilization associated with one or more of the plurality of network connections available to the wireless station. In an embodiment, the utilization of the wireless medium at the network connection may be included in the message.

Block 504 includes receiving connectivity information associated with the link, based on the indication, from the second access point. In an embodiment, the determining may be based on information received from the second access point. For example, a first access point may receive an access request from a wireless station. Based on an indication of a network connection included in the message, the first access point may communicate with the second access point. The two access points may exchange information relating to connectivity with the wireless station. The second access point may be indicated in the access request message received in block 502. Based on an exchange of information with the second access point, it may be determined that the wireless station would experience improved wireless communications if it associated with the second access point when compared to an association with the first access point.

Block 506 includes determining whether to grant access to the wireless station based, at least in part, on the indication included in the access request message and the connectivity information received from the second access point. In an embodiment, the determination may also be based on a modulation and coding scheme (MCS) used by the station. For example, if the MCS used by the wireless station results in the wireless station occupying a wireless medium for more than a threshold period of time or a threshold percentage of the wireless medium capacity, access may not be granted to the wireless station. In an embodiment, access may be granted to the wireless station based on the strength of a signal received from the wireless station. For example, if the signal strength is below a predetermined signal strength threshold, access to the wireless station may not be granted.

In an embodiment, traffic profile information may be received from the wireless station. For example, the wireless station may transmit a message indicating the traffic profile information, and the message may be received by the access point performing process 500. The traffic profile information may include an indication of one or more of the type of the wireless station, the amount of traffic the wireless station will be transmitting or receiving, or other traffic profile information. In an embodiment, the determining of whether to grant access to the wireless station may be based on the traffic profile information.

In block 508, a response is transmitted to the wireless station based on the determining. In an embodiment, the response may indicate an alternative network connection with which the wireless station should associate. In an embodiment, the alternative network connection may be selected from the plurality of network connections available to the wireless station indicated in the message of block 502. The response may also include an indication that the access request received in block 502 is denied.

Figure 6:
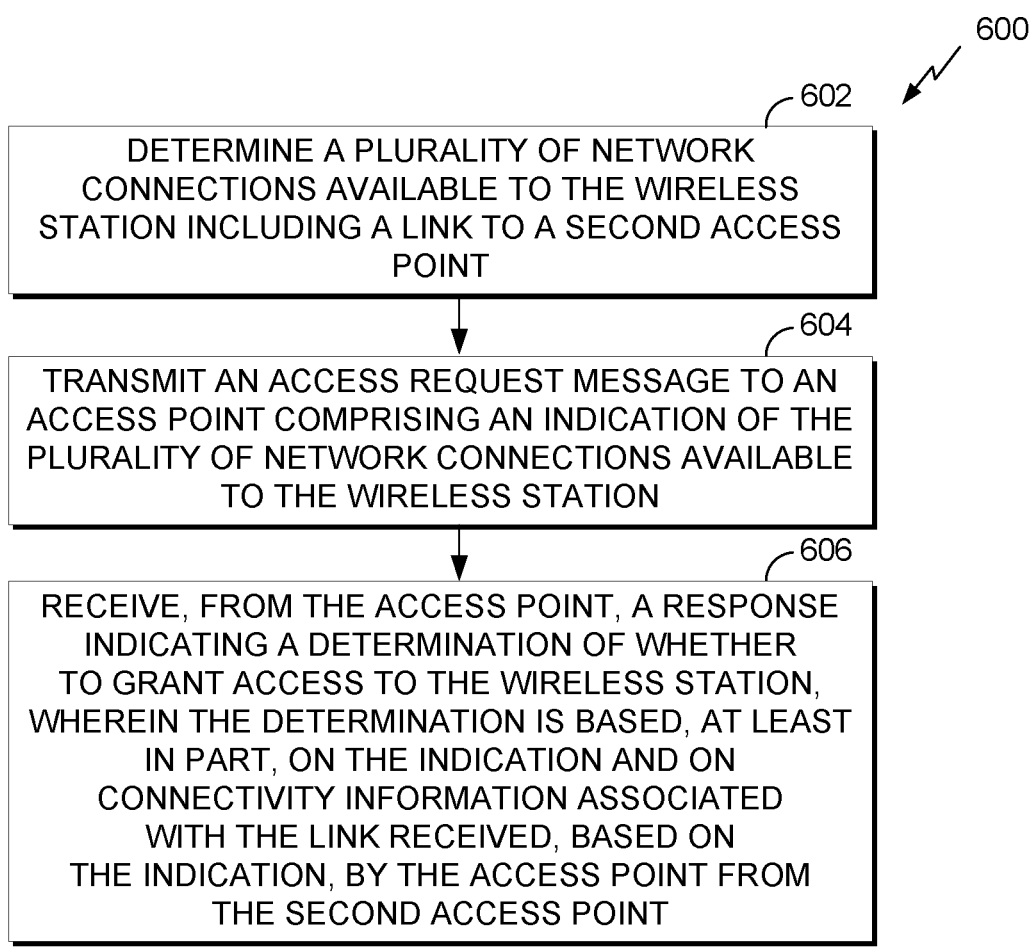
FIG. 6 is a flowchart of an exemplary method 600 for communicating on a wireless network.

FIG. 6 is a flowchart of an exemplary method 600 for communicating on a wireless network. In an embodiment, process 600 may be performed by wireless device 202, illustrated in FIG. 2. In an embodiment, process 600 is performed by a wireless station. As discussed above with respect to FIG. 5, embodiments described herein may result in improved wireless network resource utilization and/or improved wireless service for a wireless station by involving one or more access points in the determination of which access point a wireless station should form an association with.

Block 602 includes determining a plurality of network connections available to the wireless station including a link to a second access point. Once an association has been formed, additional wireless communications may be performed between the wireless station and an access point for a network connection, based on the association. For example, a wireless station may wirelessly communicate with one or more network nodes located on the Internet via wireless communications with an access point corresponding to one of the network connections.

In block 604, an access request message is transmitted to an access point. The access request message includes an indication of the plurality of network connections available to the wireless station. The access request message may additionally include one or more parameters or characteristics of the network connection, for example, information regarding the signal strength associated with the network connection. In an embodiment, the access request message may include an indication of a utilization associated with the network connection.

Block 606 includes receiving, from the access point, a response indicating a determination of whether to grant access to the wireless station. The determination may be based, at least in part, on the indication of the plurality of network connections available to the wireless station and on connectivity information associated with the link received, based on the indication, by the access point from the second access point. The response may include an indication of an access point with which the wireless station should attempt to form an association. The response may also reject the association requested by the access request message transmitted in block 604.

When the wireless station receives a response indicating an alternative network connection as described above, the wireless station may send an access request message to a second access point corresponding to the alternative network connection indicated in the response.

Figure 7:
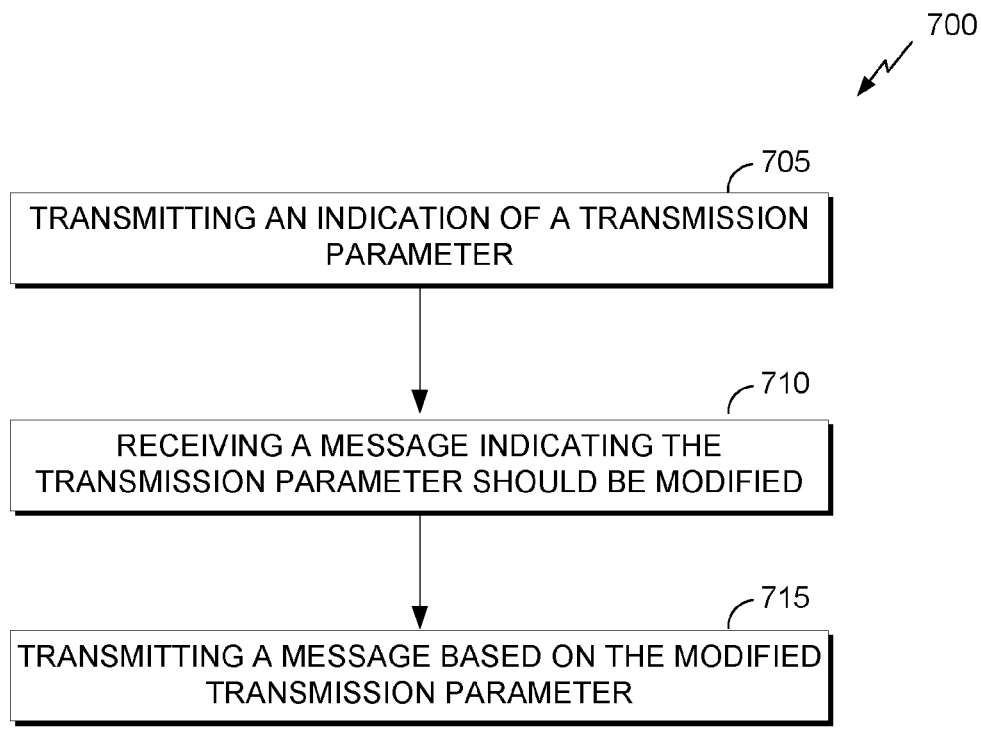
FIG. 7 is a flowchart of an exemplary method 700 for communicating on a wireless network.

FIG. 7 is a flowchart of an exemplary method 700 for communicating on a wireless network. In an embodiment, process 700 may be performed by wireless device 202, illustrated in FIG. 2. In an embodiment, process 700 is performed by an access point. In some embodiments described herein, access points within a wireless network may communicate with each other to improve the performance of the wireless network. In one aspect, communication between access points may enable the access points to tune one or more transmission parameters to reduce interference between signals generated by two or more access points. For example, in one embodiment, an access point receives an indication of a transmission parameter from a second access point. Based on one or more of its own transmission parameters, the transmission parameters indicated by the second access point, transmission parameters or characteristics of stations on the wireless network, and transmission signal characteristics such as signal strength of signals generated by the second access point, the access point may determine that the second access point should modify its transmission parameter. For example, the access point may determine that the second access point should reduce its transmission power or transmission rate to reduce interference between the two access points.

In some embodiments, communication between access points may provide for tuning of access point transmission parameters such that associations with wireless stations with undesirable signal or wireless communication characteristics is mitigated. This may improve the overall utilization of the wireless medium and/or access point, resulting in an improved quality of service for wireless stations with nominal signal characteristics.

In block 705, an indication of a transmission parameter is transmitted. In an embodiment, the transmission parameter is transmitted on a wireless network. In an embodiment, the transmission parameter is a transmission power parameter. In an embodiment, the transmission parameter is a transmission rate parameter.

In block 710, a message is received indicating the transmission parameter should be modified. In an embodiment, the message indicates the transmission parameter should be increased or decreased. In an embodiment, the message indicates a new value for the transmission parameter. In an embodiment the message is received from an access point. For example, an access point may determine that less interference will occur between wireless signals generated by the access point and a second access point if a transmission parameter of the second access point is modified. The access point may then transmit a control message to the second access point indicating the transmission parameter should be modified. This control message may be based on a message transmitted by the second access point, indicating the transmission parameter. For example, the control message may be based on the message transmitted in block 705.

In block 715, a message is transmitted based on the modified transmission parameter. For example, the message received in block 710 may indicate a transmission power should be reduced. In this embodiment, the message transmitted in block 715 will be transmitted at the reduced power level. In an embodiment, the message received in block 710 may indicate a transmission rate should be reduced. In this embodiment, the message transmitted in block 715 will be transmitted at the reduced transmission rate.

Figure 8:
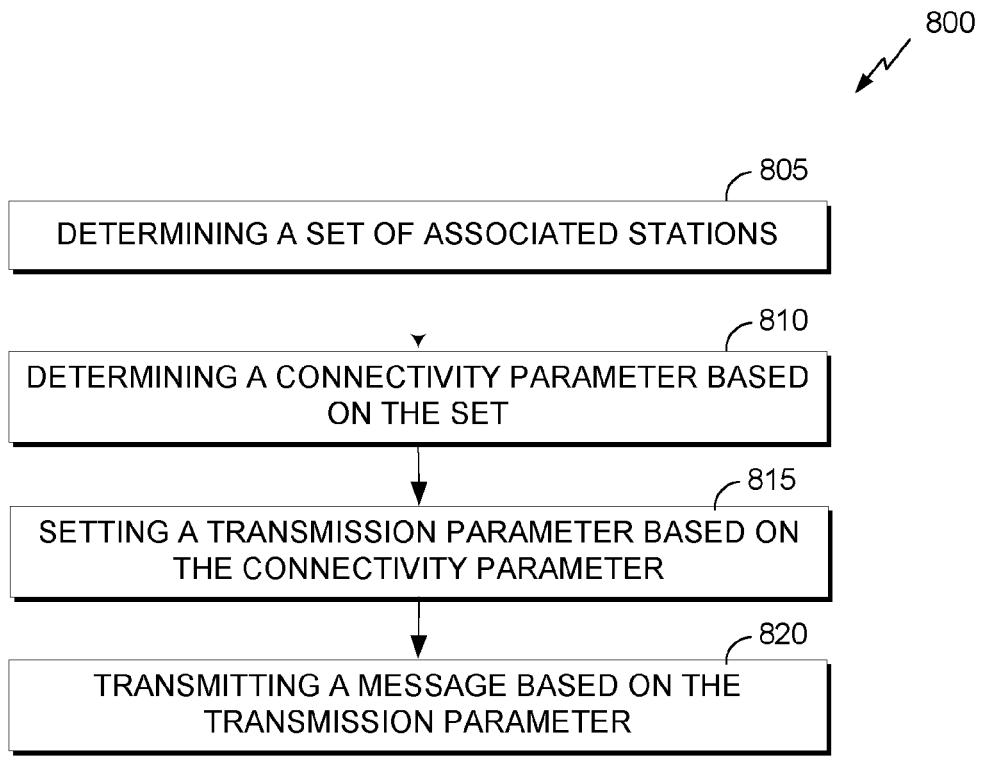
FIG. 8 is a flowchart of an exemplary method 800 for communicating on a wireless network.

FIG. 8 is a flowchart of an exemplary method 800 for communicating on a wireless network. In an embodiment, process 800 may be performed by wireless device 202, illustrated in FIG. 2. In an embodiment, process 800 is performed by an access point. In an embodiment, one or more transmission parameters may be modified based on characteristics of the wireless communications of the wireless stations with which the access point is associated. In one embodiment, adapting the transmission parameters of the access point may prevent associations with wireless stations whose signal characteristics are weak. In an embodiment, communications with these wireless stations by the access point may consume a disproportionate share of access point or wireless network resources.

In block 805, a set of associated wireless stations in determined. For example, an access point may associate with a plurality of wireless stations. Each of the network connections between the wireless stations and the access point may have different characteristics. For example, each network connection may have a particular signal strength. Each wireless station may be utilizing a specific transmission power in order to communicate with the access point. In an embodiment, all of the wireless stations associated with an access point may be included in the set. Alternatively, only wireless stations meeting a predetermined criteria may be included in the set. For example, only wireless stations of a particular type may be included in the set. In an embodiment, only wireless stations with a signal strength above or below a threshold may be included in the set.

In block 810, a connectivity parameter is determined based on the set. For example, in an embodiment, the connectivity parameter may be based on the weakest connectivity between the access point and the wireless stations in the set. In an embodiment, the weakest connectivity may be associated with the wireless station using the highest transmit power to communicate with an access point. Alternatively, the weakest connectivity may be associated with a station having the weakest signal strength as received by an access point.

In block 815, a transmission parameter is set based on the connectivity parameter. In an embodiment, the transmission parameter is a downlink or uplink budget. For example, the transmission parameter may be the downlink or uplink budget for the weakest connected wireless station in the set.

In block 820, a message is transmitted based on the transmission parameter set in block 815. For example, in an embodiment, a transmission power parameter may be set based on an uplink or downlink budget for a wireless station with a weakest connection to an access point. In an embodiment, the access point may transmit a beacon based on the transmission power parameter.

Figure 9:
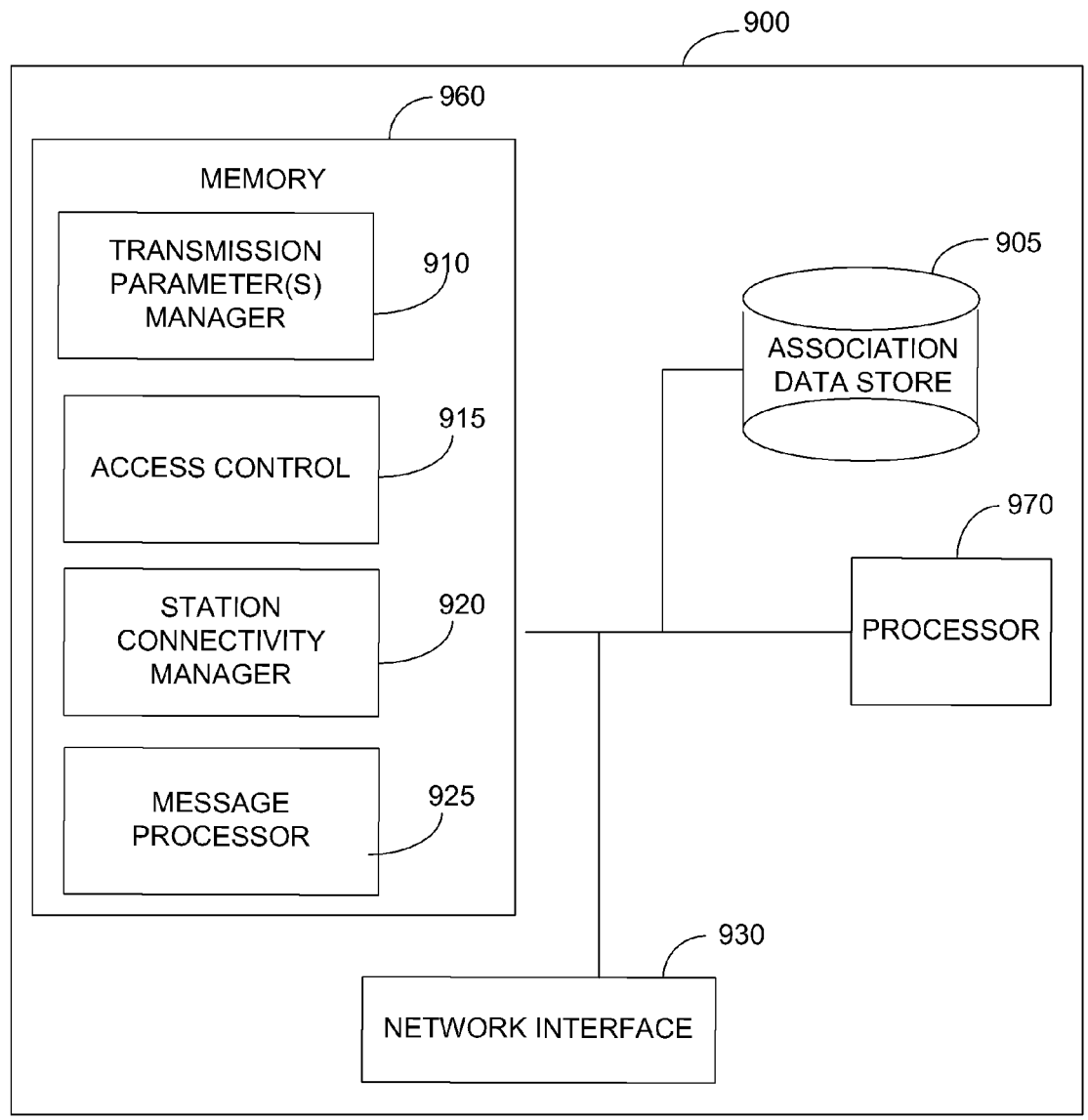
FIG. 9 is a functional block diagram of an exemplary device 900 that may be employed within the wireless communication system 100 or the wireless communication system 150.

FIG. 9 is a functional block diagram of an exemplary device 900 that may be employed within the wireless communication system 100 or the wireless communication system 150. In an embodiment, device 900 may be an embodiment of wireless device 202, illustrated in FIG. 2. In an embodiment, device 900 may be an access point 104. The device includes a processor 970, a memory 960, a network interface 930, and an association data store 905. In an embodiment, processor 970 may be equivalent to processor 204 of device 202, illustrated in FIG. 2. In an embodiment, memory 960 may be equivalent to memory 206 of device 202, illustrated in FIG. 2. It should be recognized that various embodiments of device 900 may include only a portion of the components illustrated in FIG. 9.

The memory 960 stores components that include software instructions that configure processor 970 to perform functions of device 900. The memory 960 includes a transmission parameters manager 910, an access control component 915, a station connectivity manager 920, and a message processor 925.

The access control component 915 stores instructions that configure processor 970 to determine whether to grant an access request from a wireless station. If the access request is granted, information indicating the station is stored in the association data store 905. In an embodiment, instructions in the access control component 915 may be configured to perform one or more functions discussed above with respect to block 506 of FIG. 5.

Instructions in the message processor 925 configure the processor 970 to receive and transmit messages over network interface 930. In an embodiment, message processor 925 may be configured to perform one or more functions discussed above with respect to one or more of blocks 502 or 508 of FIG. 5, block 604 of FIG. 6, blocks 705, 710, or 715 of FIG. 7, or block 820 of FIG. 8.

The transmission parameter manager 910 includes instructions that configure processor 970 to manage transmission parameters for device 900. For example, transmission parameter manager 910 may manage transmission power or rate parameters associated with transmitting data using transmitter 210 of device 202. In an embodiment, transmission parameter manager 910 may be configured to perform one or more functions discussed above with respect to blocks 705-715 of FIG. 7, or blocks 815-820 of FIG. 8.

The station connectivity manager 920 includes instructions that configure processor 970 to determine one or more station connectivity parameters. For example, the station connectivity manager 920 may consult the association data store 905 to determine a set of stations associated with device 900. The station connectivity manager 920 may then determine one or more connectivity parameters of the access point based on the set. In an embodiment, instructions in the station connectivity manager 920 may be configured to perform one or more functions as discussed above with respect to blocks 805, 810, or 815 of FIG. 8.

In an embodiment, the network interface 930 may configure the transmitter 210 of wireless device 202 to transmit data on a wireless network. In an embodiment, the network interface 930 may configure the receiver 212 of wireless device 202 to receive data from a wireless network.

Figure 10:
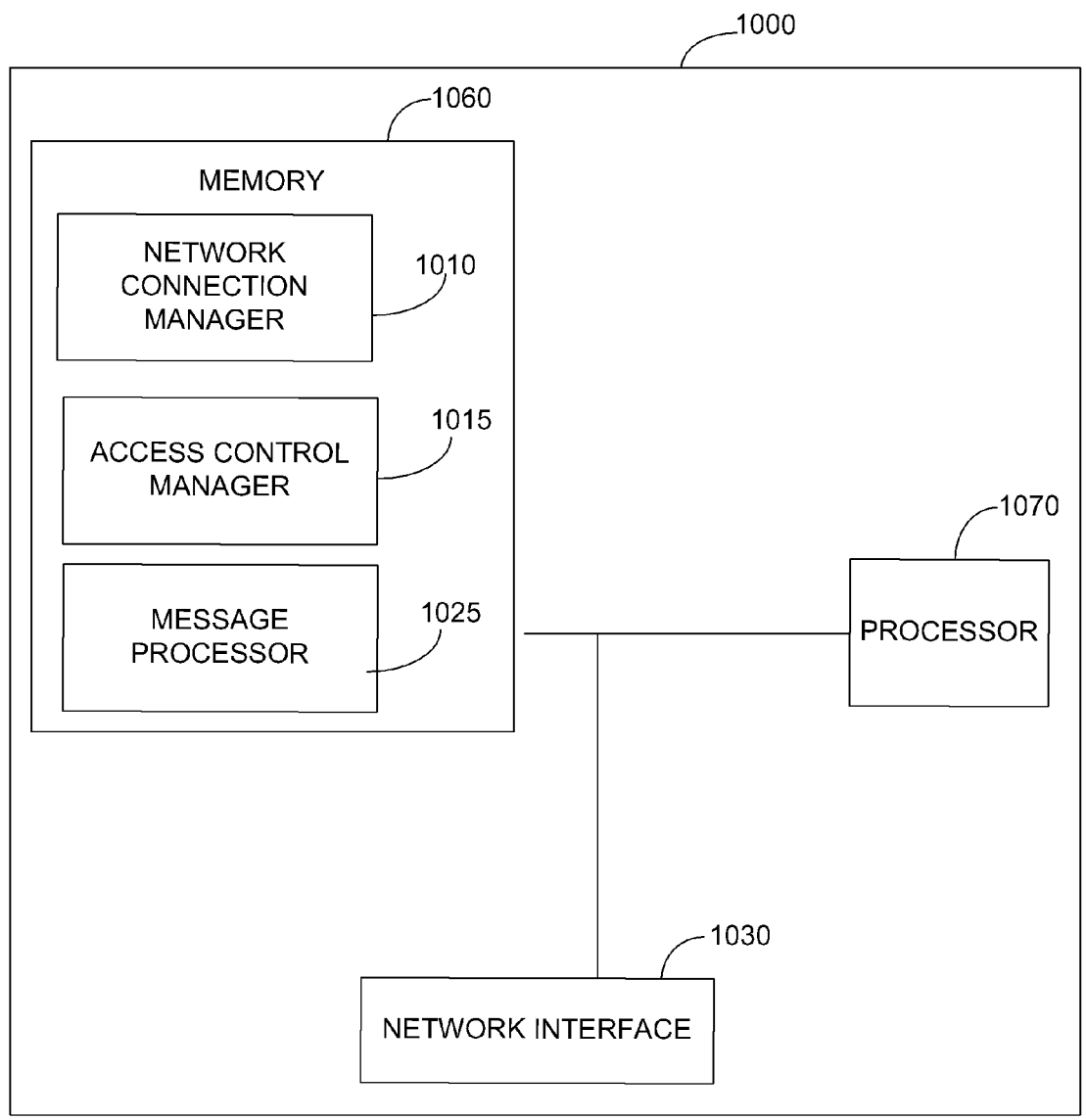
FIG. 10 is a functional block diagram of an exemplary device 1000 that may be employed within the wireless communication system 100 or the wireless communication system 150.

FIG. 10 is a functional block diagram of an exemplary device 1000 that may be employed within the wireless communication system 100 or the wireless communication system 150. In an embodiment, device 1000 may be an embodiment of wireless device 202, illustrated in FIG. 2. In an embodiment, device 1000 may be a wireless station 106. The device includes a processor 1070, a memory 1060, and a network interface 1030. In an embodiment, processor 1070 may be equivalent to processor 204 of device 202, illustrated in FIG. 2. In an embodiment, memory 1060 may be equivalent to memory 206 of device 202, illustrated in FIG. 2. It should be recognized that various embodiments of device 1000 may include only a portion of the components illustrated in FIG. 10.

The memory 1060 stores components that include instructions that configure processor 1070 to perform functions of device 1000. The memory 1060 includes a network connection manager 1010, a message processor 1025, and an access control manager 1015.

Instructions in the network connection manager 1010 may configure processor 1070 to perform one or more functions associated with managing network connections available to device 1000. For example, the network connection manager 1010 may detect one or more network connections available to device 1010, and one or more characteristics or parameters associated with those network connections. In an embodiment, instructions in the network connection manager 1010 may be configured to perform one or more of the functions as discussed above with respect to block 602 of FIG. 6.

Instructions in the message processor 1025 configure processor 1070 to perform one or more functions associated with receiving or transmitting messages on a wireless network. Instructions in the message processor 1025 may configure the network interface 1030 to transmit or receive messages on the wireless network. In an embodiment, instructions in the network connection manager may be configured to perform one or more of the functions as discussed above with respect to block 604 of FIG. 6.

Instructions in the access control manager 1015 configure processor 1070 to perform one or more access control functions. For example, the access control manager 1015 may determine an access point to associate with based on network connections detected and managed by network connections manager 1010. In an embodiment, access control manager may also determine an access point to associate with based on messages received by message processor 1025. In an embodiment, the instructions in the access control manager may be configured to perform one or more of the functions discussed above with respect to block 604.

In an embodiment, the network interface 1030 may configure the transmitter 210 of wireless device 202 to transmit data on a wireless network. In an embodiment, the network interface 1030 may configure the receiver 212 of wireless device 202 to receive data from a wireless network.

Figure 11:
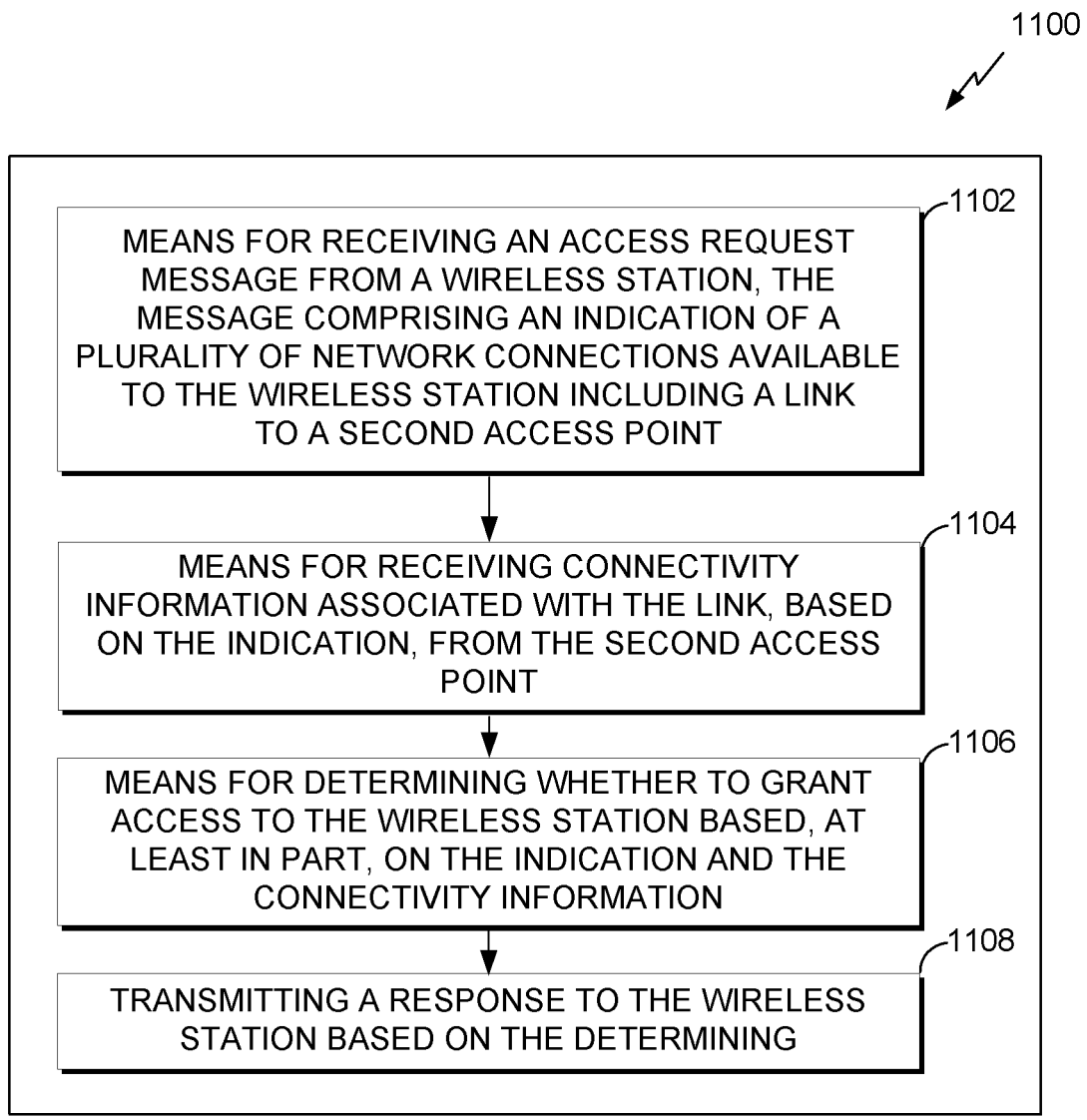
FIG. 11 is a simplified block diagram of several sample aspects of an apparatus for wireless communication in accordance with one implementation.

FIG. 11 is a simplified block diagram of several sample aspects of an apparatus for wireless communication in accordance with one implementation. Those skilled in the art will appreciate that the apparatus may have more components than illustrated in FIG. 11. The apparatus 1100 includes only those components useful for describing some prominent features of implementations within the scope of the claims. In one implementation, the apparatus 1100 is configured to perform the method 500 shown above in FIG. 5. The apparatus 1100 may be any suitable apparatus, such as the access point 104 shown in FIG. 1, which may be shown in more detail as the wireless device 202 shown in FIG. 2.

In one implementation, the apparatus 1100 includes means 1102 for receiving an access request message from a wireless station, the message comprising an indication of a plurality of network connections available to the wireless station including a link to a second access point. In an implementation, the means 1102 can be configured to perform one or more of the functions described above with respect to block 502 of FIG. 5. The means 1102 may comprise the receiver 212 shown in FIG. 2, for example.

The apparatus 1100 may further include means 1104 for receiving connectivity information associated with the link, based on the indication, from the second access point. In an implementation, the means 1104 can be configured to perform one or more of the functions described above with respect to block 504 of FIG. 5. The means 1104 may comprise the receiver 212 shown in FIG. 2, for example.

The apparatus 1100 may further include means 1106 for determining whether to grant access to the wireless station based, at least in part, on the indication and the connectivity information. In an implementation, the means 1106 can be configured to perform one or more of the functions described above with respect to block 506 of FIG. 5. The means 1106 may comprise at least the processor 204 shown in FIG. 2, for example.

The apparatus 1100 may further include means 1108 for transmitting a response to the wireless station based on the determining. In an implementation, the means 1108 can be configured to perform one or more of the functions described above with respect to block 508 of FIG. 5. The means 1108 may comprise at least the transmitter 210 shown in FIG. 2, for example.

Figure 12:
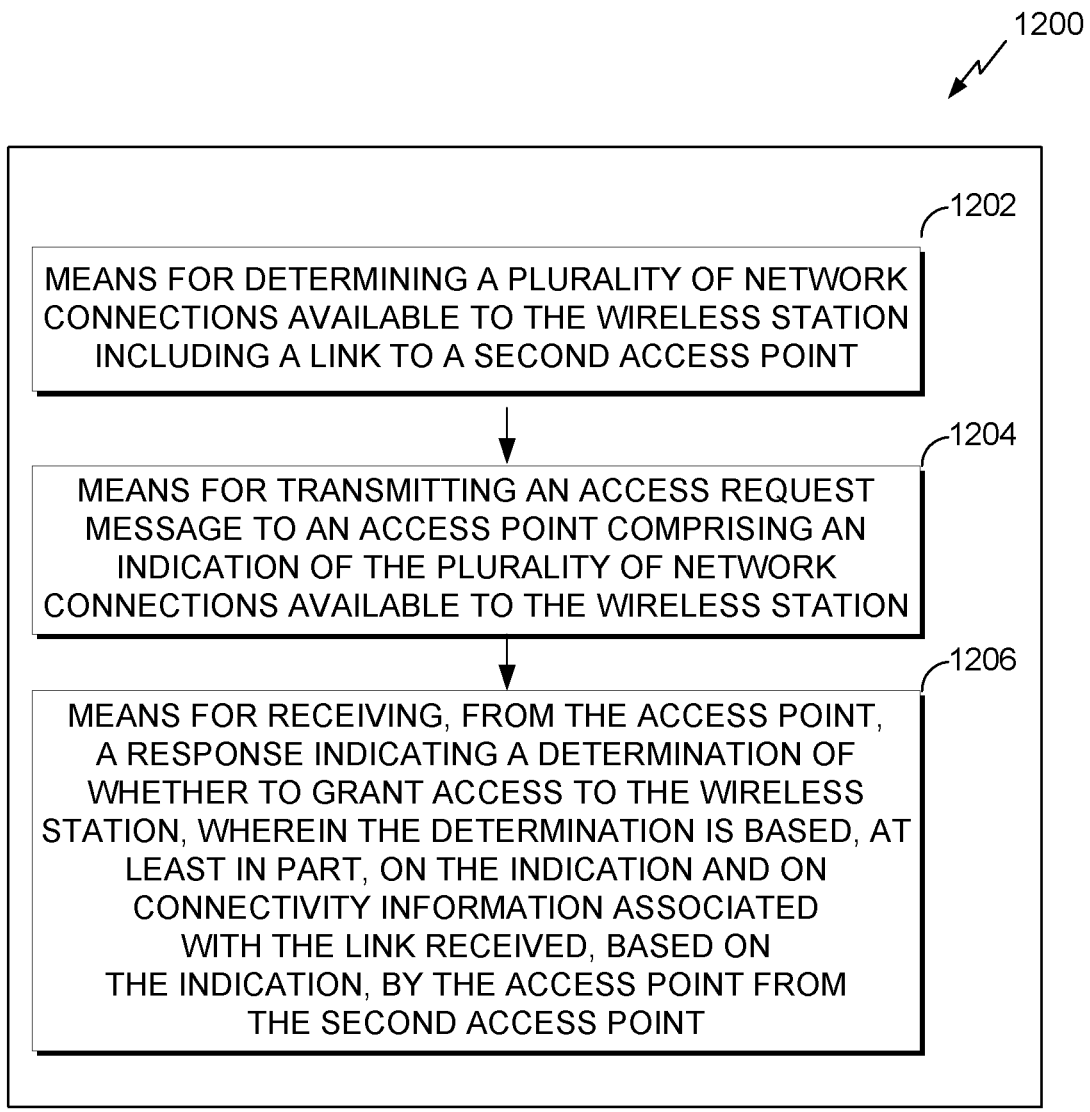
FIG. 12 is a simplified block diagram of several sample aspects of an apparatus for wireless communication between a station and an access point in accordance with one implementation.

FIG. 12 is a simplified block diagram of several sample aspects of an apparatus for wireless communication between a wireless station and an access point in accordance with one implementation. Those skilled in the art will appreciate that the apparatus may have more components than illustrated in FIG. 12. The apparatus 1200 includes only those components useful for describing some prominent features of implementations within the scope of the claims. In one implementation, the apparatus 1200 is configured to perform the method 600 shown above in FIG. 6. The apparatus 1200 may be any suitable apparatus, such as any of the STAs 106 shown in FIG. 1, which may be shown in more detail as the wireless device 202 shown in FIG. 2.

In one implementation, the apparatus 1200 includes means 1202 for determining a plurality of network connections available to the wireless station including a link to a second access point. In an implementation, the means 1202 can be configured to perform one or more of the functions described above with respect to block 602 of FIG. 6. The means 1202 may comprise at least the processor 204 shown in FIG. 2, for example.

The apparatus 1200 may further include means 1204 for transmitting an access request message to an access point comprising an indication of the plurality of network connections available to the wireless station. In an implementation, the means 1204 can be configured to perform one or more of the functions described above with respect to block 604 of FIG. 6. The means 1204 may comprise the transmitter 210 shown in FIG. 2, for example.

The apparatus 1200 may further include means 1206 for receiving, from the access point, a response indicating a determination of whether to grant access to the wireless station, wherein the determination is based, at least in part, on the indication and on connectivity information associated with the link received, based on the indication, by the access point from the second access point. In an implementation, the means 1206 can be configured to perform one or more of the functions described above with respect to block 606 of FIG. 6. The means 1206 may comprise at least the receiver 212 shown in FIG. 2, for example.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like. Further, a "channel width" as used herein may encompass or may also be referred to as a bandwidth in certain aspects.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Thus, in some aspects computer readable medium may comprise non-transitory computer readable medium (e.g., tangible media). In addition, in some aspects computer readable medium may comprise transitory computer readable medium (e.g., a signal). Combinations of the above should also be included within the scope of computer-readable media.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

What is claimed is:

1. A method of wireless communication by a first access point, comprising:
   receiving an access request message from a first wireless station requesting association with the first access point, the message comprising a list of a plurality of network connections available to the first wireless station, the list including a second access point, the message further comprising traffic profile information of the first wireless station;
   receiving information from the second access point indicating a quality of a network connection between the second access point and the first wireless station and indicating a utilization of each channel of the second access point;
   determining whether associating the first wireless station with the first access point would provide improved wireless network resource allocation among the first access point and the second access point, or improved wireless service for the first wireless station, compared to associating the first wireless station with the second access point;
   determining whether to grant the first wireless station access to the first access point or the second access point based on the traffic profile information and the determination of whether the first access point would provide the improved wireless network resource allocation or the improved wireless service compared to the second access point;
   transmitting a response to the first wireless station based on the determination of whether to grant the first wireless station access to the first access point or the second access point, the response denying the association request and including an indication of the second access point and a first channel for transmission;
   determining a transmission parameter for a second wireless station that is associated with the first access point; and
   lowering transmission power of beacons by the first access point based on the transmission parameter for the second wireless station to avoid receiving access request messages from the first wireless station.

2. The method of claim 1, wherein determining whether to grant the first wireless station access to the first access point or the second access point is further based on an indication of a signal strength associated with one or more of the plurality of network connections available to the first wireless station.

3. The method of claim 1, wherein determining whether to grant the first wireless station access to the first access point or the second access point is further based on a modulation and coding scheme (MCS) used by the first wireless station.

4. A first access point for wireless communication, comprising:
   a receiver configured to:
      receive an access request message from a first wireless station requesting association with the first access point, the message comprising a list of a plurality of network connections available to the first wireless station including a second access point, the message further comprising traffic profile information of the first wireless station, and
      receive information from the second access point indicating a quality of a network connection between the second access point and the first wireless station and indicating a utilization of each channel of the second access point;
   a processor configured to:
      determine whether associating the first wireless station with the first access point would provide improved wireless network resource allocation among the first access point and the second access point, or improved wireless service for the first wireless station, compared to associating the first wireless station with the second access point, and
      determine whether to grant the first wireless station access to the first access point or the second access point based on the traffic profile information and the determination of whether the first access point would provide the improved wireless network resource allocation or the improved wireless service compared to the second access point,
      determine a transmission parameter for a second wireless station that is associated with the first access point, and
      lower transmission power of beacons transmitted by the first access point based on the transmission parameter for the second wireless station to avoid receiving access request messages from the first wireless station; and
   a transmitter configured to transmit a response to the first wireless station based on the determination of whether to grant the first wireless station access to the first access point or the second access point, the response denying the association request and including an indication of the second access point and a channel for transmission.

5. The access point of claim 4, wherein the processor is further configured to determine whether to grant the first wireless station access to the first access point or the second access point based on an indication of a signal strength associated with one or more of the plurality of network connections available to the first wireless station.

6. The access point of claim 4, wherein the processor is further configured to determine whether to grant the first wireless station access to the first access point or the second access point based on a modulation and coding scheme (MCS) used by the first wireless station.

7. A first access point for wireless communication, comprising:
- first means for receiving an access request message from a first wireless station requesting association with the first access point, the message comprising a list of a plurality of network connection available to the first wireless station including a second access point, the message further comprising traffic profile information of the first wireless station;
- second means for receiving information from the second access point indicating a quality of a network connection between the second access point and the first wireless station and indicating a utilization of each channel of the second access point;
- first means for determining whether associating the first wireless station with the first access point would provide improved wireless network resource allocation among the first access point and the second access point, or improved wireless service for the first wireless station, compared to associating the first wireless station with the second access point;
- second means for determining whether to grant the first wireless station access to the first access point or the second access point based on the traffic profile information and the determination of whether the first access point would provide the improved wireless network resource allocation or the improved wireless service compared to the second access point;
- means for transmitting a response to the first wireless station based on the determination of whether to grant the first wireless station access to the first access point or the second access point, the response denying the association request and including an indication of the second access point and a first channel for transmission;
- third means for determining a transmission parameter for a second wireless station that is associated with the first access point; and
- means for lowering transmission power of beacons by the first access point based on the transmission parameter for the second wireless station to avoid receiving access request messages from the first wireless station.

8. The access point of claim 7, wherein the second means for determining is further configured to determine whether to grant the first wireless station access to the first access point or the second access point based on an indication of a signal strength associated with one or more Of the plurality of network connections available to the first wireless station.

9. The access point of claim 7, wherein the second means for determining is further configured to determine whether to grant the first wireless station access to the first access point or the second access point based on a modulation and coding scheme (MCS) used by the first wireless station.

10. The access point of claim 7, wherein the first means for receiving an access request message from the first wireless station comprises a first receiver, the second means for receiving information from the second access point comprises a second receiver, and the means for transmitting a response to the first wireless station comprises a transmitter.

11. The access point of claim 7, wherein the first means for determining comprises a first processor, the second means for determining comprises a second processor, the third means for determining comprises a third processor, and the means for lowering transmission power comprises a fourth processor.

* * * * *